Sept. 16, 1969       M. L. GREENBERG       3,466,951
MACHINE TOOLS AND INSTRUMENTS
Filed Jan. 15, 1968       5 Sheets-Sheet 1

INVENTOR.
MYRON L. GREENBERG
BY
Barnes, Kisselle, Raisch & Choate
ATTORNEYS

Sept. 16, 1969  M. L. GREENBERG  3,466,951
MACHINE TOOLS AND INSTRUMENTS
Filed Jan. 15, 1968  5 Sheets-Sheet 2
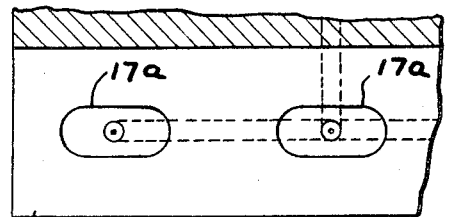
FIG. 4
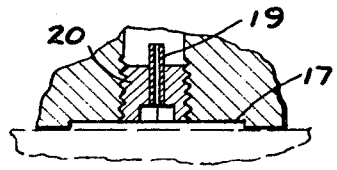
FIG. 5
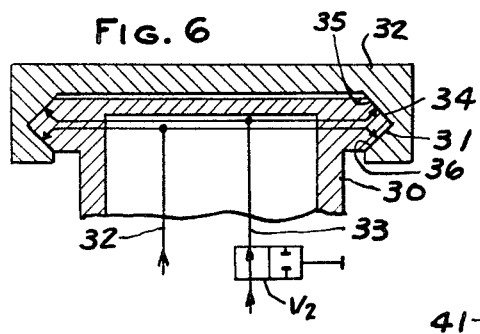
FIG. 6
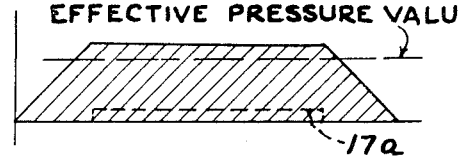
FIG. 5a
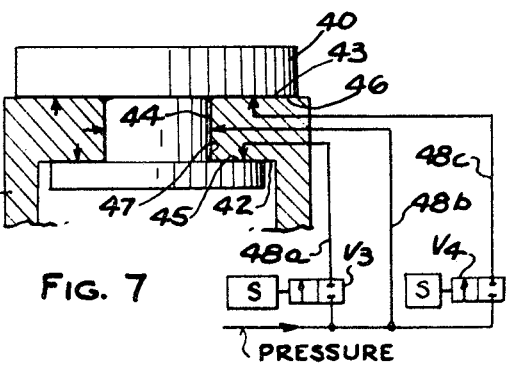
FIG. 7
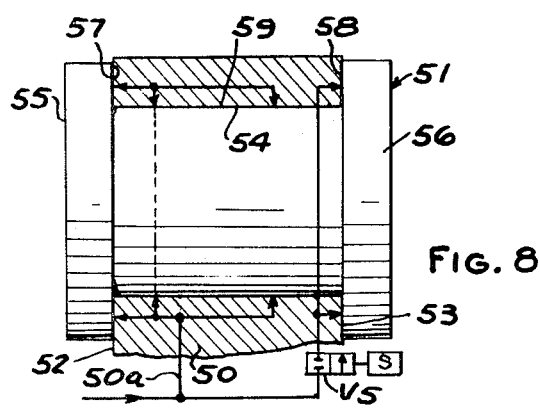
FIG. 8
FIG. 7a
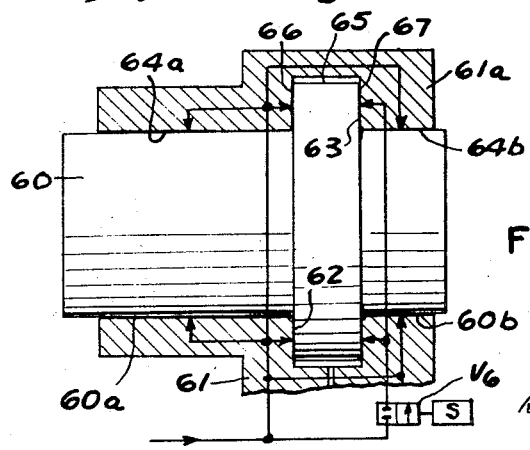
FIG. 9
INVENTOR.
MYRON L. GREENBERG
BY
Barnes, Kisselle, Raisch & Choate
ATTORNEYS

INVENTOR.
MYRON L. GREENBERG

Sept. 16, 1969   M. L. GREENBERG   3,466,951
MACHINE TOOLS AND INSTRUMENTS
Filed Jan. 15, 1968   5 Sheets-Sheet 4

PRESSURE

INVENTOR.
MYRON L. GREENBERG
BY
Barnes, Kisselle, Raisch & Choate
ATTORNEYS

Sept. 16, 1969  M. L. GREENBERG  3,466,951
MACHINE TOOLS AND INSTRUMENTS
Filed Jan. 15, 1968  5 Sheets-Sheet 5

INVENTOR.
MYRON L. GREENBERG
BY
Barnes, Kisselle, Raisch & Choate
ATTORNEYS

United States Patent Office 3,466,951
Patented Sept. 16, 1969

3,466,951
MACHINE TOOLS AND INSTRUMENTS
Myron L. Greenberg, Union Lake, Mich., assignor to The Babcock & Wilcox Company, New York, N.Y., a corporation of New Jersey
Filed Jan. 15, 1968, Ser. No. 698,032
Int. Cl. B23b *39/00;* B23d *7/08*
U.S. Cl. 77—1                                   36 Claims

ABSTRACT OF THE DISCLOSURE

The machine tool and instrument shown herein comprises a first and second member which have complementary surfaces, some of which are provided with presure pads and restrictors to which fluid under pressure is supplied. The surfaces are oppositely disposed so that when fluid is supplied to the pressure pads, the second member is maintained in spaced stable relation to the first member so that it can be readily moved with respect to the first member. After the second member is located, means are provided for interrupting or varying the flow of fluid to some of said pressure pads so that the pressure due to the remainder of the pressure pads urges the second member into fixed clamped relation with respect to said first member. Pressurized surfaces in other directions, such as the journal or lateral guides remain energized so that accuracy in transverse directions is not lost. The invention is shown as applied to a rotary table, slide and spindle.

---

This invention relates to machine tools and instruments and particularly to supports for workpieces or other articles to be operated upon for machining, inspecting, assembling and the like.

BACKGROUND OF THE INVENTION

The problem of providing a stable, non-influencing machine tool and instrument clamp is old, and recurs frequently. It is particularly prevalent in numerical control (N/C) and other servo operated or tracer controlled machining systems. Consider, for instance, the use of a point-to-point N/C rotary table as part of a machining center, boring mill or other machine tool. The normal control sequence is that, when positioning of the machine is completed (or simultaneously if it is important to save time and if the control has sufficient capacity), the rotary table's location is fed in. The rotary table section of the N/C unit then feeds out an error signal in analog or digital form which drives either an electric amplifier or a hydraulic servo valve which in turn drives the actuator, which may be an electric motor, a hydraulic motor, a hydraulic cylinder, etc., to reduce the error to zero. Normally tachometer signals, intermediate speed loops and other devices are used for stability and high gain near null.

When the desired position is reached, the servo error signal is zero, and so is the output torque. At this time, it is usually necessary to provide a clamping mechanism the actuation of which is triggered by the null value of the error signal. This clamping mechanism has commonly been a pair of jaws acting on a ring or a split ring acting on a solid ring on the table rotor. Whatever the details of its mechanical motion, when the clamp closes it is unable to provide purely radial forces. One edge must always engage first and, since there must be a certain amount of free motion in order for the clamp parts to move, the remainder of the closing motion is compelled to exert a component of tangential force. Because the clamp forces must be quite large, this component of force usually is of considerable amplitude so that it moves the table out of position in spite of the opposition of the servo. In addition, because the table bearings are of large diameter and must have some freedom of lateral movement, the clamp exerts a considerable decentering force, which has the effect of inducing eccentricity into the table position.

Various methods of eleiminating these problems have been suggested such as operating the clamp slowly so that the servo has time to return the table to position, but these methods have resulted in accelerated wear on the drive and the clamp mechanism.

It has heretofore been proposed in machine tools and instruments that one member may be maintained in stable spaced relation with respect to another member by providing pressure pads and associated restrictors to which fluid is supplied under pressure in a manner to cause a thin film of fluid to flow between complementary surfaces of the members and thereby maintain the members in spaced stable relation with respect to one another. Typical arrangements are shown in the patents of Gordon H. Porath 3,145,513 (1964), 3,180,661 (1965), 3,183,732 (1965), 3,193,334 (1965), 3,200,671 (1965), 3,223,463 (1965), 3,231,319 (1966) 3,290,065 (1966).

The present invention makes use of the configuration and properties of hydrostatic bearing supports for such devices as slides, rotary tables and spindles among others.

Among the objects of the present invention are to provide arrangements wherein one member may be maintained in spaced stable relation with respect to another to facilitate movement thereof and thereafter clamped in adjusted position, which is easily manipulatable and readily applicable to present systems.

A further object of the invention is to provide a clamping system which requires no aditional mechanism, linkages, jaws, split rings, etc., but only external valves.

Still a further object of the invention is to provide a clamping system which will not wear and which takes advantage of existing hydrostatic configurations.

Another object of the invention is to provide a clamping system which will not induce decentering or indeed any forces in undesired directions.

A further object of the invention is to provide a clamping system which, when actuated, will not produce motion along the servo axis or other sensitive positioning axis of the machine.

SUMMARY

The machine tool and instrument shown herein comprises a first and second member which have complementary surfaces, some of which are provided with pressure pads and restrictors to which fluid under pressure is supplied. The surfaces are oppositely disposed so that when fluid is supplied to the pressure pads, the second member is maintained in spaced stable relation to the first member so that it can be readily moved with respect to the first member. After the second member is located, means are provided for interrupting or varying the flow of fluid to some of said pressure pads so that the pressure due to the remainder of the pressure pads urges the second member into fixed clamped relation with respect to said first member. The invention is shown as applide to a slide, rotary table and spindle.

DESCRIPTION OF THE DRAWINGS

FIG. 4 is a fragmentary view taken in the direction of the arrow 4 in FIG. 2.

FIG. 5 is a fragmentary sectional view taken along the line 5—5 in FIG. 3.

FIG. 5a is a graph of pressure versus location, taken along the cross section of the pocket 17a.

FIG. 6 is a partly diagrammatic view of another form of the invention.

FIG. 7 is a partly diagrammatic sectional view of another form of the invention.

FIG. 7a is a partly diagrammatic fragmentary sectional view of another form of the invention.

FIG. 8 is a partly diagrammatic sectional view through another form of the invention.

FGI. 9 is a partly diagrammatic sectional view of another form of the invention.

Figure 10:
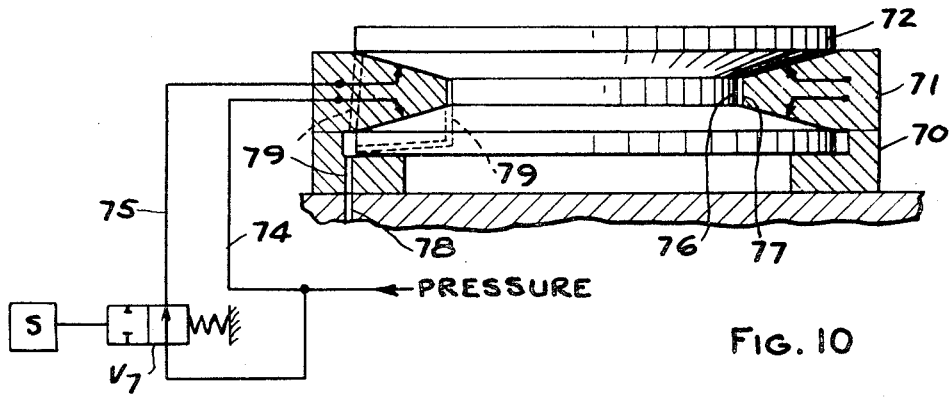

FIG. 10 is a partly diagrammatic sectional view of another form of the invention.

Figure 11:
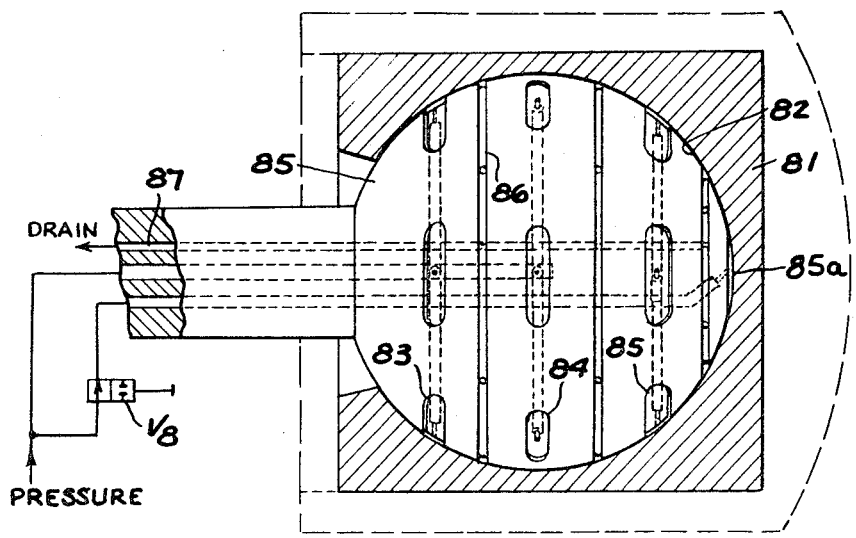

FIG. 11 is a partly diagrammatic sectional view of a further form of the invention.

Figure 12:
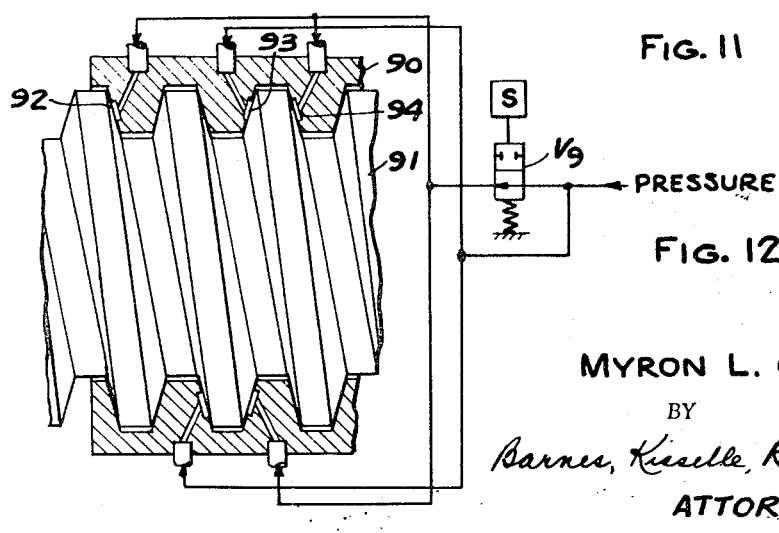

FIG. 12 is a partly diagrammatic sectional view of another form of the invention.

Figure 13:
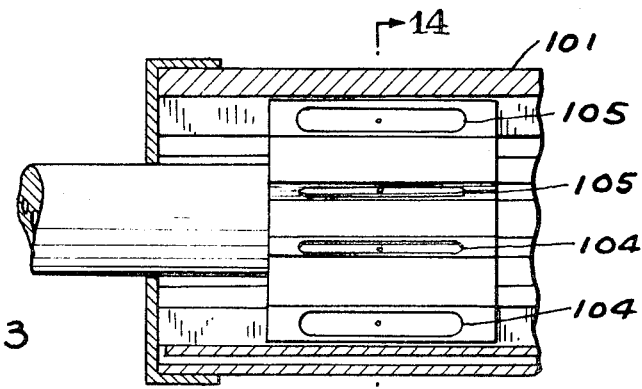

FIG. 13 is a sectional view of another form of the invention.

Figure 14:
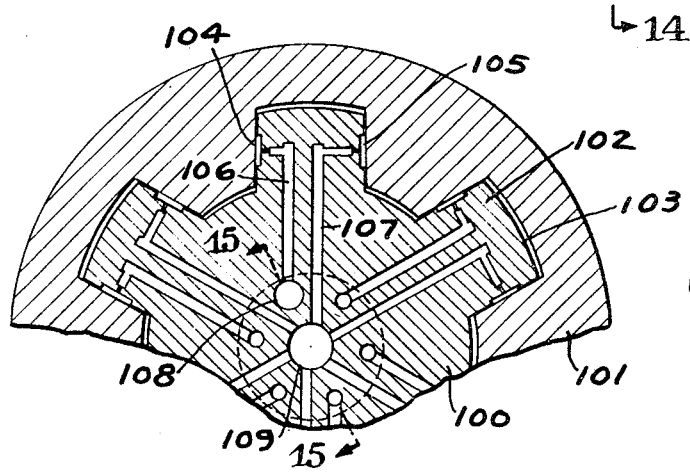

FIG. 14 is a fragmentary sectional view taken along the line 14–14 in FIG. 13.

Figure 15:
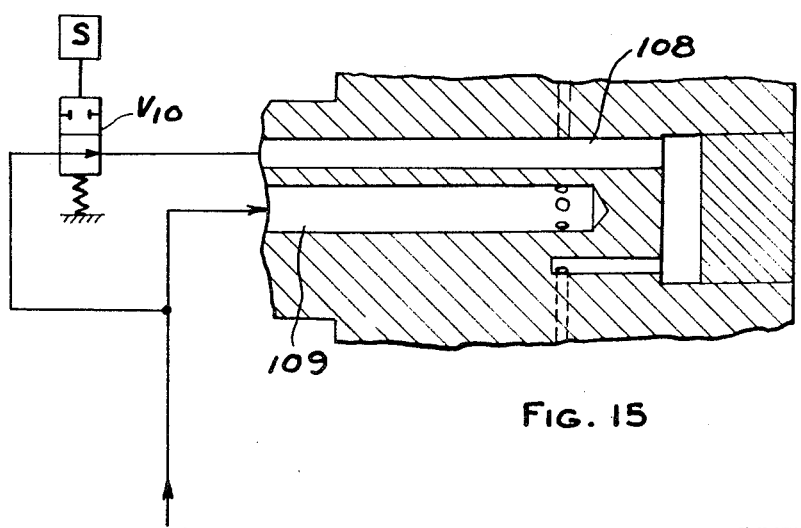

FIG. 15 is a fragmentary sectional view on an enlarged scale taken along the line 15—15 in FIG. 14 showing diagrammatically the valve connections.

Figure 16:
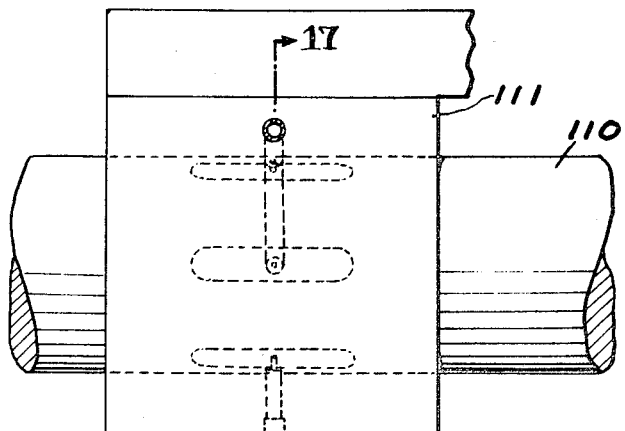

FIG. 16 is a fragmentary side elevational view of a further form of the invention.

Figure 17:
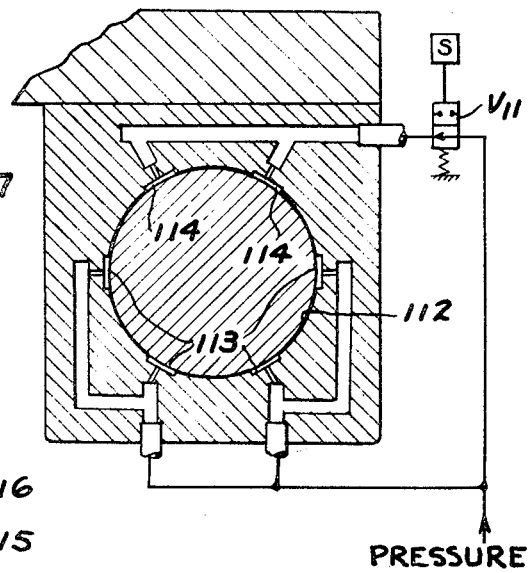

FIG. 17 is a fragmentary sectional view taken along the line 17-17 showing diagrammatically the valve connections.

Figure 18:
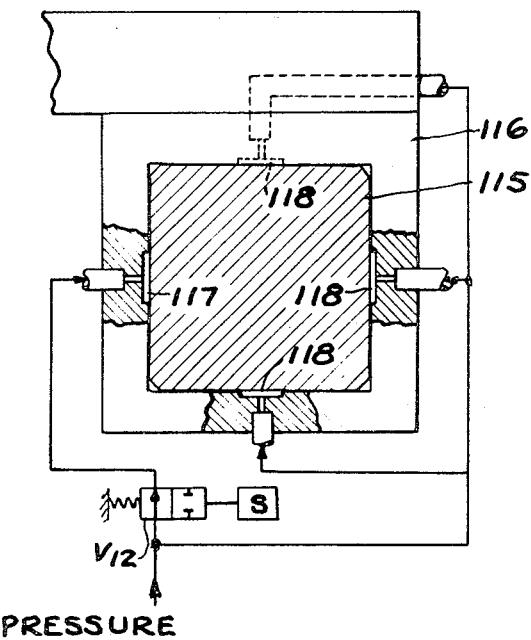

FIG. 18 is a fragmentary part sectional partly diagrammatic view of a further modified form of the invention.

DESCRIPTION

The invention is applicable to various apparatus for supporting a workpiece or tool and moving the workpiece of tool to a precise position where it must thereafter be maintained in fixed stable accurate position.

Figure 1:
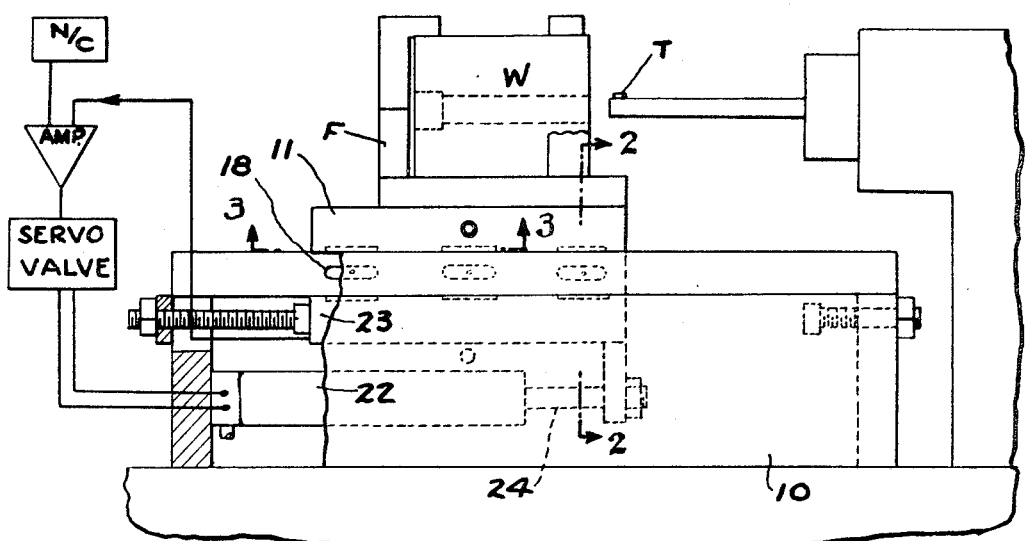
FIG. 1 is a fragmentary side elevational view of an apparatus embodying the invention.
Figure 2:
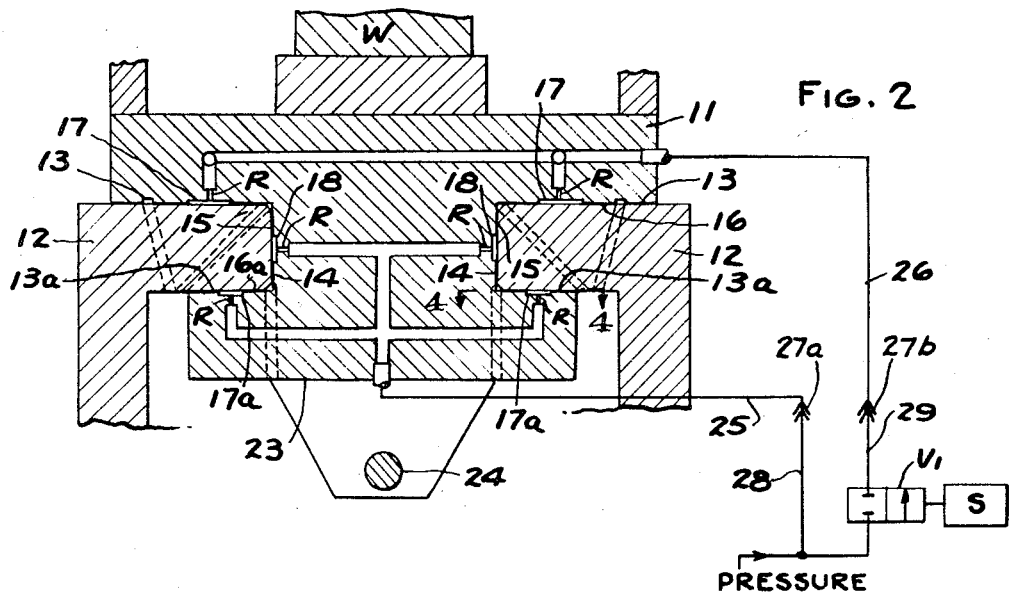
FIG. 2 is a fragmentary partly diagrammatic sectional view taken along the line 2—2 in FIG. 1.
Figure 3:
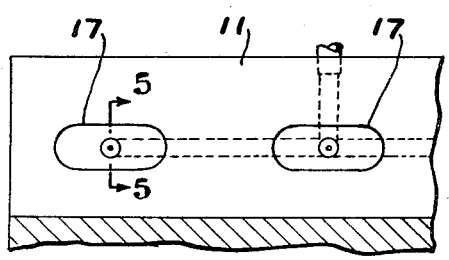
FIG. 3 is a fragmentary plan view of a portion of the apparatus shown in FIGS. 1 and 2.

Referring to FIGS. 1–5, the invention is shown as applied to a slide or a machine base. Specifically, base 10 supports a slide 11 on which, typically, a workpiece W in a fixture F is positioned for machining by a tool T. As shown in FIG. 2, the base 10 comprises spaced portions or ways 12 which extend toward one another to define a slideway having spaced parallel horizontal surfaces 13 and 13a and a vertical surface 14. The slide 11 is formed complementary to ways 12, having complementary spaced horizontal surfaces 16 and 16a and complementary vertical surfaces 15.

Each of the surfaces 13, 13a, 14 is provided with pressure pockets or recesses 17, 17a, 18 and a restrictor R is associated with each pressure pad. As shown in FIG. 5, the restrictor comprises a capillary tube 19 that is supported in a screw 20 that is threaded into an opening in the base of the pressure pad 17. Fluid under pressure is supplied from a source via line 28, coupling 27a and line 25 to the pressure pads 17a, 18 and through solenoid operated valve $V_1$, line 29, coupling 27b and line 26 to the pressure pads 17.

The slide is adapted to be moved from a loading to a work position by a piston rod 24 actuated by a cylinder 22, preferably servo controlled in a loop consisting of a position transducer 23, amplifier, valve, actuator, the slide, and a command input. Other actuators, such as lead screws can also be used, and other transducers such as those which read lead screw rotation can be used. It is also possible to use this method of clamping with devices which are crudely located by an actuator and then precisely located by a shot pin or other positive device.

In order to facilitate the movement oft he slide 11 along the base 10, the pressure source and valve $V_1$ are actuated to permit fluid, preferably liquid, to flow under pressure to each of the restrictors and associated pads. The dimensions of the complementary surfaces are such that a thin film of fluid flows in a continuous layer between the surfaces, thereby maintaining the slide 11 in spaced stable lateral and vertical relation with respect to the base 10 while at the same time permitting movement longitudinally of the base. Piston rod 24 can then be operated to move the slide to and from loading and work positions. When the slide 11 has reached its appropriate work position, clamping may be initiated by closing the valve $V_1$ to cut off supply fluid to the upper thrust face pads 17 while the flow of fluid to the pressure pads 17a, 18 continues. The resultant loss of pressure between the surfaces 13, 16 on the top of the base causes the pressure in the lowermost pads 17a to force the slide 11 downwardly and thereby clamp the slide 11 in fixed position.

It will be noted that this method of clamping has several very helpful features. The action of the lower thrust face pressure pads is extremely uniform if the gaps are accurate and the restrictors correctly sized. Therefore, the lower thrust face acts like a hydraulic cylinder of very large area (closely related to the total effective area of the lower thust face). Note that it is not equal to the total area, since the decay of pressure across a pad as the fluid flows across the lands must be taken into account (FIG. 5a). However, instead of the force being transmitted through a piston rod which can cock and bind and produce transverse forces, it is transmitted directly to the slide through the oil film, which cannot sustain any side loading (that is, any shear force).

Furthermore, it will be observed that, since the vertical pads 18 are never depressurized, a large aligning force is always present to prevent motion across the ways or rotation about a vertical axis. Thus, the situation is that there are no perturbing forces and quite large restoring forces so that the tendency to side or axial motion is almost entirely suppressed. In addition, the available axial restraining force of the servo positioner (actuator cylinder 24 in this case), which is unfortunately quite small near the null at the desired position in most servos, is not called on for large forces as it would ordinarily be due to the action of a separate clamp.

In the form of the invention shown in FIG. 6, the base 30 is formed with dovetail surfaces 31, 34 which have the pressure pads and restrictors therein. For purposes of clarity, the pressure pads are shown as arrows. Fluid is supplied to the lowermost set of pressure pads through lines 32 while fluid is supplied to the uppermost pressure pads through lines 33 controlled, for example, by hand operated valve $V_2$ in the same manner as shown in FIG. 2. Thus, the valve is actuated to supply fluid to the upper pressure pads until the slide 32 which has complementary surfaces 34, 35 and 31, 36 is moved to the desired position. Valve $V_2$ is then actuated to interrupt the supply of fluid to the pressure pads on the uppermost surface and thereby cause the slide 32 to be clamped downwardly onto the base.

The forms of the invention shown up to this point have all been based on the assumption that, when the upper or front thrust face is depressurized, the lower thrust face (or rear thrust face) will continue to exert enough force to keep the system adequately clamped. However, there is a problem here. When the upper thrust face is depressurized, the lower thrust face gap will change from 50% to 150%, depending on the balance of the restrictors, the load, etc. This is a major change resulting in very large flow alterations (note that flow is proportional to the cube of gap) so that the pressure drop in the lower thrust face restrictors may be too great to leave much effective pressure. This can be overcome by careful selection of fluid, gap and restrictor parameters, but other approaches are worth considering. Another approach is given in the form of the invention shown in FIG. 7.

In the form of the invention shown in FIG. 7, a rotary table 40 is provided on a base 41. The base 41 has spaced horizontal parallel surfaces 42, 43 and a cylindrical opening 44. The table 40 has complementary surfaces 45, 46 and cylindrical surface 47. The surfaces 42, 43, 44 are provided with pressure pads, fluid under pressure being supplied directly through pipe 48b to the pressure pads on the surfaces 44, by valve $V_3$ through pipe 48a to the pressure pads in the surface 42 and by valve $V_4$ to those in surface 43 by way of pipe 48c. The valve $V_4$ is actuated to supply fluid to the upper thrust face pressure pads while valve $V_3$ is off until the table 40 is moved to the desired position whereafter valve $V_4$ is actuated to interrupt the flow of fluid to the pressure pads in the surfaces 43 and, simultaneously valve $V_3$ is actuated to supply fluid to the pressure pads in the lower thrust face, surfaces 42. The overall effect is to cause the table 40 to be clamped downwardly on the base.

This arrangement permits the restrictors to be so sized as to permit optimum compensation for each face in its own operating mode. That is, we consider the operation of the table system as broken up into two distinct modes, the travel mode and the clamping mode. We observe that quite different restrictor sizing is desirable for the travel mode in which the upper thrust face 43 operates as a normally compensated (say 40%–60% compensation) lift bearing as compared to the clamp mode in which the lower thrust face 42 is operated with almost no pressure drop through the restrictors. Of course, this situation does not produce as good planar accuracy during travel, since the system gain normally derived from lower thrust face compensation is not available. However, it is excellent for producing large clamping force, since the full flow from the lower thrust face is available, and centering accuracy, controlled by the pads in surface 47 which are never cut off, and clamped planar accuracy, controlled by the machining accuracy of the surfaces 43 and 46, are not impaired.

It may also be desirable to control total flow to one or both thrust faces during their operating period by a pressure compensated flow control valve (not shown) in series with upper face valve $V_4$ in order to prevent excessive and unnecessary lift during travel and in order to avoid unnecessarily careful selection of restrictors on face 43.

Another embodiment is shown in FIG. 7a, in which it is desired to preserve planar accuracy during the travel mode so that the table may be operated as either a machining or inspection device. The valves are arranged identically to FIG. 7, but the lower thrust face is continually pressurized (along with the journal) via line 48b and restrictors $R_1$. During clamping, line 48a is supplied with fluid, increasing the flow via large restrictors $R_2$, and line 48c is shut off.

It should be noted that either of these clamping means are more effective than would be anticipated by simply considering the higher pressure which they deliver to the lower thrust face, since the friction coefficient for lubricated surfaces increases as the applied pressure increases, giving a square-law or higher relation of clamping torque to pressure.

In the form of the invention shown in FIG. 8, a spindle is provided which includes a base 50 and spindle 51 rotatably mounted in the base. The base 50 includes spaced radial surfaces 52, 53 and a cylindrical opening 54. The spindle 51 includes spaced flanges 55, 56 formed with radial surfaces 57, 58 and a cylindrical surface 59. The surfaces 52, 53, 54 are formed with circumferentially spaced pressure pads, represented by the arrows, and associated restrictors. Fluid is adapted to be supplied directly to the pressure pads in the surfaces 52, 54 and to the pressure pads in the surface 53 by solenoid operated valve $V_5$. As in the previous forms of the invention, fluid is supplied through the valves and directly in a line 50a to all of the pressure pads until the spindle 56 is rotated to the desired position whereafter valve $V_5$ is actuated to interrupt the flow of fluid to the pressure pads in the surface 53 so that the spindle 56 is forced to the left bringing the surfaces 53, 58 into clamping relation.

In the form of the invention shown in FIG. 9, a spindle 60 is rotatably mounted in a two-piece base 61, 61a. The base 61, 61a includes a cavity defining spaced radial surfaces 62, 63 and a cylindrical opening with surfaces 64a and 64b each of which has circumferentially spaced pressure pads and restrictors therein represented by the arrows. The spindle 60 includes a radially extending flange 65 that has complementary surfaces 66, 67 which are complementary to the surfaces 62, 63 and cylindrical surfaces 60a, 60b which are complementary to surfaces 64a and 64b. Fluid is adapted to be supplied directly to the pressure pads in the surfaces 62, 64a and 64b and fluid is supplied to the pads in the surface 63 through a solenoid operated valve $V_6$. As in the previous forms, after the spindle is positioned valve $V_6$ is actuated to interrupt the flow of fluid to the pads in surface 63 to cause the spindle to be clamped to the right.

In the form of the invention shown in FIG. 10, the table is of the cone bearing type and comprises a two-piece base 70, 71 and a rotor or table 72. The rotor 72 and base portion 71 have complementary upper and lower conical surfaces which are provided with fluid by circumferentially spaced pressure pads and associated restrictors in the surfaces of the base portion 71. Since the upper and lower faces are inclined, the hydrostatic film between the surfaces has a horizontal component that produces a centering effect without a separate pressurized journal face. The space between the rotor face 76 and the base face 77 is vented to drain 78 by passages 79. A valve $V_7$ controls the pressurization and depressurization of the upper sets of pressure pads in the same manner as contemplated in the other forms of the invention.

In FIG. 11, the invention is shown as applied to a spherical bearing comprising a spherical member 80 and complementary member 81 having a spherical surface 82. Spherical member 80 is provided with spaced sets of circumferentially spaced pressure pads 83, 84, 85, 85a to which fluid under pressure is supplied, each pad being provided with a restrictor. When fluid is supplied, it flows in a thin film between the surface of the member 80 and the surface 82 to circumferential drain grooves 86 and then outwardly through a drain passage 87. As shown, the fluid to the pads 85, 85a is through a valve $V_8$ as contrasted to the pads 83, 84 which is supplied directly from the pressure source. The valve $V_8$ is actuated for depressurization or clamping so that when the pressure in pads 85, 85a is reduced or interrupted the spherical member 80 will be moved to the right relative to the member 81 to lock the member 81 into position.

In FIG. 12, the invention is shown as applied to a lead screw such as shown in the patent to Porath 3,183,732. Specifically, the complementary surfaces of the nut 90 with respect to the screw 91 are formed with circumferentially spaced sets of pressure pads 92, 93, 94, each of which has a restrictor associated therewith. Fluid under pressure is supplied to the pads 92, 94 through a valve $V_9$ and directly to the other pads. By manipulating the valve $V_9$, the pressure supplied to the pad 92 can be reduced or interrupted thus causing an unbalance tending to lock the nut relative to the screw.

In the form of the invention shown in FIGS. 13–15, the invention is applied to a spline. Specifically, the complementary spline members 100, 101 have teeth 102 and grooves 103. The teeth have pressure pads 104, 105 and associated restrictors on opposite side surfaces thereof which are supplied with fluid through passages 106, 107 that are connected to axial passages 108, 109. Axial passage 108 extends to a valve $V_{10}$ while axial passage 109 extends directly to a source of pressure. When fluid is supplied to both sets of pressure pads at the same pressure, a thin film of fluid flows between the surfaces of the spline members holding them in stable accurate relationship to one another. By varying the fluid supplied to the pressure pads 104 through valve $V_{10}$ or by interrupting the fluid supplied to these pads, an unbalance is created tending to clamp the surfaces with which the bearing pads 104 are associated to lock the spline members against movement.

In FIGS. 16 and 17, the invention is shown as applied to a cylindrical slide. Specifically, the cylindrical member 110 has a slide 111 thereon which has a complementary opening 112. Circumferentially spaced pressure pads 113 and 114 and associated restrictors are provided on the surface 112. Pads 113 are provided with fluid directly from the pressure source while pads 114 are supplied with fluid through a valve $V_{11}$. When fluid is supplied at the same pressure to all of the pads, the surfaces of the slide are maintained in stable spaced accurate relationship to the shaft 110. When the pressure to the pads 114 is reduced or interrupted by manipulation of the valve $V_{11}$ an unbalance is created tending to clamp the slide on the shaft 110.

In FIG. 18, the invention is shown as applied to a rectangular slide. Specifically, the square shaft 115 has a slide 116 thereon with a square opening. Pressure pads 117, 118 and associated restrictors are provided in the surfaces of the opening of the slide 116. Fluid is applied directly to the pads 118 and through a valve $V_{12}$ to the pads 117. When the fluid is supplied at the same pressure to each of the pads, the parts are maintained in stable accurate relationship to one another and when the fluid to the pad 117 is varied or interrupted, the slide is clamped with respect to the shaft.

Obviously, the clamping action in any of the systems described is not affected by orientation—the slides, rotary tables, spindles, etc., may be horizontal, vertical, sloped or tiltable in various attitudes.

It should be emphasized that there are essentially two groups of parameters here: the mechanical devices such as slides, spindles and rotary tables, and the restrictor and fluid switching systems. Except for the configuration of FIG. 6 in which there is no independent mechanical axis of motion (both thrust faces produce horizontal as well as vertical components) and its analogous rotary configuration, that is cone or sphere bearing spindles or cone bearing rotary tables, any mechanical configuration is usable under appropriate conditions with any restrictor and switching configuration. Nothing in these descriptions is intended to limit this quality of complete interchangeability.

I claim:
1. The combination comprising
a first member,
a second member supported by said first member for movement,
said first and second members having complementary surfaces,
a plurality of pressure pads associated with the surfaces on one of said members,
a restrictor associated with each said pressure pad,
means for supplying fluid under pressure to said restrictors and, in turn, to said pressure pads,
said complementary surfaces being oppositely disposed so that when liquid is supplied to at least some of said pressure pads, said second member is supported in spaced stable relationship with respect to said first member,
and means for modifying the flow to at least some of said pressure pads while continuing the flow to others of said pressure pads so that an unbalance is produced in the fluid pressure to hold the second member in immovable relation to said first member by the pressure in the pads to which liquid is continuously supplied.

2. The combination set forth in claim 1 wherein said last-mentioned means comprises a valve for interrupting the flow to some said pressure pads to which fluid is supplied.

3. The combination set forth in claim 1 wherein said last mentioned means comprises a valve for supplying fluid to additional of said pressure pads to which fluid is not being supplied.

4. The combination set forth in claim 1 wherein said second member comprises a slide,
said complementary surfaces on said first member providing a slideway, said complementary surfaces being so arranged that every pressurized surface is opposed by another pressurized surface to provide a fully compensated support for said slide member.

5. The combination set forth in claim 4 wherein said complementary surfaces on said first and second member comprise spaced parallel surfaces along each edge of the slide and oppositely disposed surfaces at an angle to said parallel surfaces along each said edge of the slide.

6. The combination set forth in claim 5 wherein said complementary surfaces comprise a dovetail configuration along each edge of said base.

7. The combination set forth in claim 4 wherein said slide and slideway have complementary cylindrical surfaces.

8. The combination set forth in claim 4 wherein said slide and slideway have complementary rectangular surfaces.

9. The combination set forth in claim 1 wherein said second member comprises a rotary table,
said complementary surfaces on each of said members comprising spaced parallel radial surfaces and complementary cylindrical surfaces at right angles to said spaced parallel surfaces, said pressure pads to which the fluid flow is modified comprising pads in one of said parallel radial surfaces.

10. The combination set forth in claim 1 wherein said second member comprises a rotary table,
said complementary surfaces on each of said members comprising annular inclined diverging surfaces and annular inclined complementary surfaces,
said pressure pads to which the fluid flow is modified comprising pads in one of said pair of annular inclined surfaces.

11. The combination set forth in claim 1 wherein said second member comprises a rotary spindle,
said complementary surfaces including spaced radial surfaces and interconnecting cylindrical surfaces about the axis of rotation of said spindle, said pressure pads to which the fluid flow is modified comprising pressure pads in one of said parallel radial surfaces.

12. The combination set forth in claim 11 wherein said spaced radial surfaces are oppositely disposed.

13. The combination set forth in claim 11 wherein said spaced radial surfaces are defined by a recess in said first member and a flange on said second member.

14. The combination set forth in claim 11 wherein said spaced radial surfaces are defined by spaced flanges on said second member and complementary oppositely disposed surfaces on said first member.

15. The combination set forth in claim 1 wherein said complementary surfaces of said members comprise spherical surfaces, said pressure pads being provided in spaced circumferentially extending rows, at least one of said rows of pressure pads comprising the pads to which fluid flow is modified.

16. The combination set forth in claim 1 wherein said complementary surfaces comprise said surfaces of a lead screw and nut respectively, said pressure pads being provided in circumferentially spaced relation on the complementary surfaces of one of said members.

17. The combination set forth in claim 1 wherein said complementary surfaces of said members comprise spline teeth and grooves, said pressure pads being provided on the complementary surfaces of one of said members.

18. The combination set forth in claim 17 wherein said pressure pads are on the sides of said teeth, said fluid flow being modified to the pads on one side of said teeth.

19. The combination comprising
a first member,
a second member supported by said first member for movement,
said first and second members having complementary surfaces,
a plurality of pressure pads associated with the surfaces on said first member,
a restrictor associated with each said pressure pad,
means for supplying fluid under pressure to said restrictors and, in turn, to said pressure pads,
said complementary surfaces being oppositely disposed so that when liquid is supplied to said pressure pads, said second member is supported in spaced stable relationship with respect to said first member,
and means for interrupting the flow to at least some of said pressure pads while continuing the flow to others of said pressure pads so that the second member is held in immovable relation to said first member by the pressure in the pads to which liquid is continuously supplied.

20. The combination set forth in claim 19 wherein said last-mentioned means comprises a valve for interrupting the flow to said pressure pads.

21. The combination set forth in claim 19 including fluid operated means for moving said second member relative to said first member.

22. The combination set forth in claim 19 wherein said second member comprises a slide,
said complementary surfaces on said first member providing a slideway, said complementary surfaces being so arranged that every pressurized surface is opposed by another pressurized surface to provide a fully compensated support for said slide member.

23. The combination set forth in claim 22 wherein said complementary surfaces on said first and second member comprise spaced parallel surfaces along each edge of the slide and oppositely disposed surfaces at an angle to said parallel surfaces along each side edge of the slide.

24. The combination set forth in claim 23 wherein said complementary surfaces comprise a dovetail configuration along each edge of said base.

25. The combination set forth in claim 23 wherein said slide and slideway have complementary cylindrical surfaces.

26. The combination set forth in claim 23 wherein said slide and slideway have complementary rectangular surfaces.

27. The combination set forth in claim 19 wherein said second member comprises a rotary table,
said complementary surfaces on each of said members comprising spaced parallel radial surfaces and complementary cylindrical surfaces at right angles to said spaced parallel surfaces, said pressure pads to which the fluid flow is modified comprising pressure pads in one of said parallel radial surfaces.

28. The combination set forth in claim 19 wherein said second member comprises a rotary table,
said complementary surfaces on each of said members comprising annular inclined diverging surfaces and annular inclined complementary surfaces,
said pressure pads to which the fluid flow is modified comprising pads in one of said pair of angularly inclined surfaces.

29. The combination set forth in claim 19 wherein said second member comprises a rotary spindle,
said complementary surfaces including spaced radial surfaces and interconnecting cylindrical surfaces about the axis of rotation of said spindle, said pressure pads to which the fluid flow is modified comprising pressure pads in one of said parallel radial surfaces.

30. The combination set forth in claim 29 wherein said spaced radial surfaces are oppositely disposed.

31. The combination set forth in claim 29 wherein said spaced radial surfaces are defined by a recess in said first member and a flange on said second member.

32. The combination set forth in claim 29 wherein said spaced radial surfaces are defined by spaced flanges on said second member and complementary oppositely disposed surfaces on said first member.

33. The combination set forth in claim 19 wherein said complementary surfaces of said members comprise spherical surfaces, said pressure pads being provided in circumferentially spaced rows, at least one of said rows of pressure pads comprising the pad to which fluid flow is modified.

34. The combination set forth in claim 19 wherein said complementary surfaces comprise said surfaces of a lead screw and nut respectively, said pressure pads being provided in circumferentially spaced relation on the complementary surfaces of one of said members.

35. The combination set forth in claim 19 wherein said complementary surfaces of said members comprise spline teeth and grooves, said pressure pads being provided on the complementary surfaces of one of said members.

36. The combination set forth in claim 35 wherein said pressure pads are on the sides of said teeth, said fluid flow being modified to the pads on one side of said teeth.

References Cited

UNITED STATES PATENTS

| | | | |
|---|---|---|---|
| 2,520,879 | 8/1950 | Dall | 90—58 XR |
| 3,209,623 | 10/1965 | Schardt | 90—58 XR |
| 3,231,319 | 1/1966 | Porath | 308—5 |
| 3,395,947 | 8/1968 | Brown | 308—5 |

GERALD A. DOST, Primary Examiner

U.S. Cl. X.R.

90—58; 308—5